(12) United States Patent
Jones (10) Patent No.: US 7,789,356 B1
(45) Date of Patent: Sep. 7, 2010

(54) STAND ASSEMBLY FOR AN OPTICAL DEVICE

(76) Inventor: Steven P. Jones, 135 Black Bear Rd., Saddlebrooke, MO (US) 65630

( * ) Notice: Subject to any disclaimer, the term of this patent is extended or adjusted under 35 U.S.C. 154(b) by 252 days.

(21) Appl. No.: 11/901,228

(22) Filed: Sep. 17, 2007

Related U.S. Application Data (60) Provisional application No. 60/858,712, filed on Nov. 14, 2006.

(51) Int. Cl.
*F16M 11/02* (2006.01)
*G03B 17/00* (2006.01)

(52) U.S. Cl. ............ 248/178.1; 248/187.1; 396/428

(58) Field of Classification Search ............ 248/178.1, 248/121, 122.1, 179.1, 180.1, 187.1, 176.3, 248/439, 223.41, 224.51, 224.61, 222.14, 248/913, 177.1; 396/428, 329, 419
See application file for complete search history.

(56) References Cited

U.S. PATENT DOCUMENTS

| | | | |
|---|---|---|---|
| 765,980 A | 7/1904 | Mercier | |
| 2,175,114 A * | 10/1939 | Friedmann et al. | 396/329 |
| 2,403,892 A | 10/1944 | McFarlane | |
| 2,408,247 A * | 9/1946 | Wekeman | 355/21 |
| 2,538,910 A | 1/1951 | Miller | |
| 2,667,825 A | 2/1954 | Nicholas | |
| 2,713,609 A | 7/1955 | Niklason | |
| 2,776,102 A * | 1/1957 | Schlafly | 248/179.1 |
| 2,791,950 A * | 5/1957 | Oppenheimer | 396/329 |
| 2,794,612 A | 6/1957 | Clifton | |
| 3,015,468 A * | 1/1962 | Mooney | 248/125.2 |
| 3,491,669 A * | 1/1970 | McBride | 396/329 |
| 3,503,316 A * | 3/1970 | Shibata et al. | 396/329 |
| 3,586,278 A * | 6/1971 | Simons | 248/165 |
| 3,598,355 A | 8/1971 | English | |
| 3,614,047 A | 10/1971 | Hitze | |
| 4,029,246 A * | 6/1977 | Woodruff | 224/275 |
| 4,219,268 A * | 8/1980 | Uchida | 396/428 |
| 4,952,953 A * | 8/1990 | Ridderstolpe et al. | 396/428 |
| 5,322,251 A * | 6/1994 | Schumer et al. | 248/187.1 |
| 5,752,113 A | 5/1998 | Borden | |
| 5,791,623 A * | 8/1998 | Louridas | 248/451 |
| 5,993,077 A * | 11/1999 | Jones | 396/428 |
| 6,161,807 A * | 12/2000 | Steiner et al. | 248/166 |
| 6,231,017 B1 | 5/2001 | Watkins | |
| 6,439,515 B1 * | 8/2002 | Powers | 248/129 |

\* cited by examiner

*Primary Examiner*—Anita M King
(74) *Attorney, Agent, or Firm*—Neil F. Markva (57) ABSTRACT

A free-standing assembly maintains an optical device at a location spaced from a stand assembly supporting surface. The stand assembly comprises an elongated rail member having a longitudinal axis and a plurality of sides, leg support members each including a transverse centerline and two outer distal end sections each having an angled planar surface for mounting a leg member. A novel mechanism fixes each leg support member to a side of the elongated rail member and in a direction transverse to the rail member longitudinal axis. A plurality of leg members each has one end thereof mounted to the angled planar surface for projecting outwardly from an outer distal end of the leg support members. Another novel mechanism supports the optical device at a selected location on another side of the rail member and includes a mechanism for movably mounting the optical device along the elongated rail member.

20 Claims, 11 Drawing Sheets

STAND ASSEMBLY FOR AN OPTICAL DEVICE

RELATED APPLICATION

This is a non-provisional application for which priority is claimed in Provisional Application No. 60/858,712 filed Nov. 14, 2006.

BACKGROUND OF THE INVENTION

1. Field of the Invention

The present invention relates to a stand assembly system for supporting an optical device over an extended footprint that covers any desired size and at a spaced distance from a stand supporting surface. More particularly, the invention is directed to a versatile stand assembly that may be used for close-up photography over an extended distance with an adjustable lens camera.

2. Background Description

This invention comprises an improvement on my stand assembly of U.S. Pat. No. 5,993,077 in that the support base member is an elongated bar material that may be of any length so as to extend the assembly footprint to cover any desired size. All the advantages of the previous camera stand are associated with the camera stand assembly of this invention. Additional advantages will be understood once details of the invention and the prior art are understood.

3. State of Prior Art

Various stand assemblies for mounting a camera that may be laterally moved along a beam or parallel rails are known. U.S. Pat. Nos. 765,980 ('980); 2,403,892 ('892); 2,667,825 ('825); 2,794,612 ('612); 3,614,047 ('047); 5,752,113 ('113); and 6,231,017 ('017) each discloses a mechanism for fixing a camera or cameras at variable positions along an elongated structure. Patent '980 depicts a stereoscopic camera system comprising two (2) cameras adjustably and fixedly connected to a slide bar at variable distances from the center thereof. Patent '892 discloses a long, narrow beam having a support block with a tripod screw to which a camera is attached. The camera can be elevated by telescoping tube legs or positioned a given working distance using fixed length legs.

Patent '825 discloses a camera mounted to slidingly move in a first axis along parallel rails of a frame element that is adjustable in a second axis along the length of a pair of parallel rods. Patent '612 depicts a portable camera stand having a camera engaging member pivotally mounted to a supporting plate disposed on a rod that is slidably received in a sleeve. Means adjustably move the rod up and down to position a camera at a desired vertical height. Patent '047 discloses a camera stand including a base element having at opposite ends thereof a pair of pivotally mounted legs wherein each pair pivots individually. The mounted camera may be rotatably and longitudinally moved along and fixed in various positions on elongated base elements.

Patent '113 discloses a panoramic indexing camera mount that includes elongated arms having grooves in which thumb screws operate to loosen and tighten camera carrying brackets to move and adjust camera position along the length of the elongated arms. The camera is mounted on a tripod for panoramic rotation. Patent '017 discloses a camera mount bar for supporting video equipment in which an elongated bracket supports a pivotally mounted camera and a video image display. The bracket position is adjustable along the length of the camera mount bar.

U.S. Pat. Nos. 2,538,910 ('910); 2,713,609 ('609); and 3,598,355 ('355) disclose known movie and television cameras driven along rails. Patent '910 discloses a television and photography system for race tracks wherein cameras are mounted on a carriage that moves along parallel tracks. Patent '609 discloses a camera support rail structure with four (4) legs. Two (2) carriages are mounted to ride in perpendicular directions with respect to each other on two (2) pairs of parallel rails. Patent '355 depicts a camera dolly mounted on a frame having a pair of spaced-apart parallel rails carried on adjustable height leg supports. Intended for use underwater, the dolly carries a motion picture camera and rolls lengthwise of the rails.

PURPOSE OF THE INVENTION

The primary object of the invention is to provide an optical device stand assembly comprising an elongated rail member on which an optical device may be slidingly moved to any desired disposed position along the rail member to effectively cover a subject being lighted and/or photographed.

Another object of the invention is to provide an optical device stand assembly comprising a plurality of support brackets movably mounted to an elongated rail member for disposing a plurality of optical devices at any desired position along the rail member.

Still another object of the invention is to provide an optical device stand assembly comprising an elongated rail member including telescoping or fixed length legs having an infinite number of positions for allowing the optical device to either be level or skewed in relation to the subject, in relation to the support for the subject, or in relation to the support surface for the assembly.

A further object of the invention is to provide a camera stand assembly comprising a camera support bracket movably mounted on an elongated rail member for producing three-dimensional images by optically overlapping exposed camera frames.

Another object of the invention is to provide an optical device stand assembly comprising an elongated optical device support member for extending the movement of the optical device and having telescoping legs mounted to distal ends of transverse outrigger members.

A further object of the invention is to provide an optical device stand assembly comprising an elongated rail member including two (2) leg members at distal end sections of outrigger or leg support members transversely mounted to the rail member wherein the leg members do not interfere with the field of view of a camera.

Still another object of the invention is to provide an optical device stand assembly comprising an elongated rail member that is removably mounted across two (2) transverse leg support members having leg members removably fixed to the distal ends thereof.

A still further object of the invention is to provide a camera stand assembly comprising an elongated rail member removably mounted to two (2) transverse leg support members each having laterally spaced transverse slots wherein a camera may be moved along the "x" axis of the rail member that may be selectively positioned along the "y" axis of the leg support members.

Another object of the invention is to provide a camera stand assembly comprising an elongated rail member removably mounted to two (2) transverse leg support members each having means for supporting the rail member with a camera disposed thereon so that the camera may be shifted fore and aft of the leg support transverse centerline to improve the center of balance and camera viewing area of the assembly.

Still another object of the invention is to provide an optical device stand assembly comprising an elongated rail member removably mounted across two (2) transverse leg support members having leg members that include outer free ends defining an assembly footprint when the stand assembly is free-standing on an assembly supporting surface.

A further object of the invention is to provide an optical device stand assembly comprising an elongated rail member and a pair of outrigger or leg support members having two (2) leg members removably fixed to distal ends of the outrigger members so as to extend an assembly footprint to horizontally cover any desired size along an assembly supporting surface.

A further object of the invention is to provide an optical device stand assembly comprising two (2) leg members attached to distal ends of two (2) transverse leg support members removably fixed to opposing sides of an elongated rail member so that the rail member extends vertically with respect to an assembly supporting surface.

Another object of the invention is to provide an optical device stand assembly comprising an elongated rail member including a groove that extends parallel to the longitudinal axis of the rail member with a camera support bracket slidably disposed to move along the length of the groove, and tightening means for fixing the location of the bracket with respect to the groove.

These and other objectives are accomplished by the unique structural combination of the invention as described herein.

SUMMARY OF THE INVENTION

The invention is directed to a free-standing assembly for maintaining an optical device at a location spaced from a stand assembly supporting surface. The stand assembly comprises an elongated rail member having a longitudinal axis and a plurality of sides, leg support members each including a transverse centerline and two outer distal end sections each having means for mounting a leg member. A feature of the invention releasably fixes each leg support member to a side of the elongated rail member and in a direction transverse to the rail member longitudinal axis. A plurality of leg members each has one end thereof mounted to the angled planar surface for projecting outwardly from an outer distal end of the leg support members. Another feature of the invention supports the optical device at a selected location on another side of the rail member and includes a mechanism for movably mounting the optical device along the elongated rail member.

In a specific embodiment, the elongated rail member includes a groove having an inner surface extending along the length of the rail member and parallel to the longitudinal axis of the rail member. Means for supporting the optical device on a side of the rail member includes a support bracket having slide means shaped to fit into and be maintained in the groove for slidably moving the support bracket along the rail member. The optical device supporting means includes tightening means for drawing the slide means against the inner surface of the groove to releasably fix the position of the support bracket at a selected location along the rail member. The optical device may be a film camera, a digital camera, a video camera, lighting, a magnifier, an observation scope, or some combination thereof. More specifically, when the optical device is a camera it may have adjustable lens means for projecting outwardly from a camera body portion to provide a selected focal length to photograph an object located in a field of view without obtaining an image of the leg support members or leg members in a resultant photograph. Each leg member includes an outer free end thereof defining an assembly footprint when the stand assembly is free-standing on a stand assembly supporting surface.

Another feature of the invention comprises an elongated rail member including undercut grooves that extend parallel to the longitudinal axis and along the length of two sides of the rail member. One undercut groove slidably carries an optical device support bracket along the length of the rail member, and a groove on another side of the rail member carries at least two said leg support members longitudinally laterally spaced along said rail member so that the rail member is substantially horizontally disposed with respect to the assembly supporting surface. Here the optical device support bracket includes slide means shaped to fit into and be maintained in the one undercut groove for slidingly moving the support bracket along the one undercut groove. Other features of the invention provide an the elongated rail member includes undercut grooves that each extend parallel to the longitudinal axis and along the length of the rail member. An undercut groove slidably carries an optical device support bracket along the length of one side of the rail member, and undercut grooves on opposing sides of the rail member each carry a fixedly disposed leg support member so that the rail member is normal to the assembly supporting surface. The undercut grooves each has an inner surface and may extend along the length of two sides of the rail member. The means for removably fixing each leg support member to the rail member includes means shaped to fit into the undercut groove on a side of the rail member, and adjusting means for tightening the means shaped to fit into the undercut groove against the inner surface of the groove to releasably fix the leg support members to the rail member.

A further feature of the invention is directed to leg support members that include at least one transverse slot that is parallel to the transverse centerline of the leg support member and has a width that is effective to engage and receive one side of the rail member at the center, forwardly, or rearwardly of the leg support member transverse centerline. The slot includes a bore extending through the leg member and is effective to receive a threaded projection. The elongated rail member includes undercut grooves each having an inner surface and extending parallel to said longitudinal axis and along the length of the rail member. The leg support members have identical structural configurations effective to be interchangeable.

The means for removably fixing each leg support member to the rail member includes first slide means shaped to fit into a groove on a side of the rail member, and adjusting means for tightening the slide means against an inner surface of the groove to releasably fix the leg support members to the rail member. The shaped first slide means includes a threaded bore to threadingly receive a threaded projection and the adjusting means includes knob means fixedly connected to one end of a threaded projection that threadingly engages the threaded bore of the first shaped slide means so that by rotating the knob the threaded projection draws it tightly against the inner surface of the groove to releasably fix the leg support member to the rail member. In another embodiment, the first slide means is fixedly connected to one end of a threaded projection and the adjusting means includes knob means having a threaded bore that threadingly engages the threaded projection so that by rotating said knob means the threadingly engaged threaded projection draws said slide means tightly against the inner surface of the groove to releasably fix the leg support member to the rail member. When two transverse leg support members are removably mounted to the elongated rail member, each leg support member includes means for supporting the rail member with an optical device disposed thereon. And the rail member supporting means is effective to shift the optical device fore or aft of the leg support transverse centerline to improve the center of balance and viewing area for the optical device of the assembly. More specifically, this is possible when each leg support member has three transverse slots each having a width that is effective to engage and receive one side of the rail member at the center, forwardly, or rearwardly of the leg support member transverse centerline, and each slot includes a bore that extends through the leg member and is effective to receive a threaded projection.

Another feature of the invention is directed to a free-standing assembly for maintaining an optical device at a location spaced from a stand assembly supporting surface. The stand assembly comprises an elongated rail member having a longitudinal axis and undercut grooves each having an inner surface and extending parallel to said longitudinal axis and along the length of two sides of the rail member. Leg support members undergird the elongated rail member, and each leg support member includes a transverse centerline and two outer distal end sections each having means for mounting a leg member. Means removably fix each leg support member to a side of the elongated rail member and in a direction transverse to its longitudinal axis. The means for removably fixing each leg support member to the rail member includes first slide means shaped to fit into an undercut groove on a side of the rail member. Adjusting means tighten the shaped first slide means against the inner surface of the groove to fix the leg support members to the rail member. A plurality of leg members each includes means for mounting one end thereof to project outwardly from an outer distal end of each leg support member, and each leg member includes an outer free end thereof defining an assembly footprint when the stand assembly is freestanding on a stand assembly supporting surface. Mounting means support the optical device on another side of the rail member and includes second slide means shaped to fit into and be maintained in an undercut groove for moving the optical device along the elongated rail member. Tightening means draws the second slide means against the inner surface of the undercut groove to selectively fix and position the mounting means along the rail member.

More particularly, the stand assembly of the invention comprises an elongated rail member having a longitudinal axis, a plurality of sides, and a length of from about 1½ feet up to about 16 feet, and a plurality of leg members. Leg support members each includes a transverse centerline, two outer distal end sections each having means for mounting a leg member, three transverse slots each having a width that is effective to engage and receive one side of said rail member at the centerline, and forwardly, or rearwardly of the leg support member transverse centerline. Each slot includes a bore extending through the leg member and being effective to receive a threaded projection. The elongated rail member includes undercut grooves each having an inner surface and extending parallel to its longitudinal axis and along the length of at least two sides of the rail member. Means removably fix each leg support member to a side of the elongated rail member and in a direction transverse to the rail member longitudinal axis. The means for removably fixing each leg support member to the rail member includes first slide means shaped to fit into an undercut groove on a side of the rail member, and adjusting means tighten the first slide means shaped to fit into undercut groove against the inner surface of the groove to fix the leg support members to the rail member. Each leg member includes means for mounting one end thereof to project outwardly from an outer distal end section of the leg support members. Means for supporting said optical device at a selected location on a side of said rail member includes an angle iron bracket having a first leg section that supports universal pivotal coupling means for connecting a optical device to the elongated rail member, and a second leg section that supports second slide means shaped to fit into and be maintained in the undercut groove for moving the support bracket along the length of the rail member. Tightening means for draws the second slide means against the inner surface of the undercut groove to selectively fix and position the support bracket along said rail member.

In one embodiment, each first slide means has a threaded bore that threadingly engages a fixed threaded projection that extends through a bore disposed within a transverse slot of the leg support members, and the adjusting means includes knob means fixedly connected to the threaded projections to tighten the first slide means against the inner surface of the groove to fix the leg support members to the rail member. The elongated rail member has a length of about 18 inches and each leg support member has a length of about 9 inches so that when each first slide means is loosened, the leg support members may be stored in a direction parallel to the rail member and tightened to be in fixed alignment with the length of the rail member. Each leg member has a delimited length sufficient to maintain the rail member from about 2 inches to about 3 inches above the assembly supporting surface. The second slide means includes a threaded bore to threadingly receive a threaded projection that extends through a bore disposed within the second leg section of the angle iron bracket. The tightening means includes knob means fixedly connected to one end of a threaded projection that threadingly engages the second slide means so that by rotating the knob the threaded projection threadingly engages the second slide means to tighten the second slide means against the inner surface of the groove to fix the angle iron bracket to the rail member. Each leg support member includes at the end of each distal end section thereof an angled planar surface that carries the means for mounting the one end of each leg support member.

Another feature of the invention is directed to an elongated rail member that includes undercut grooves each having an inner surface and extending parallel to the longitudinal axis and along the length of two sides of the rail member. One undercut groove slidably carries an optical device support bracket along the length of the rail member and a groove on another side of the rail member carries the leg support members. The means for supporting the optical device includes an angle iron bracket having a first leg section that supports universal pivotal coupling means for connecting the optical device to the elongated rail member, and a second leg section that supports slide means shaped to fit into and be maintained in the one undercut groove for slidably moving the support bracket along the length of the groove. Tightening means for drawing the slide means against the inner surface of the undercut groove releasably fixes the position of the support bracket at the selected location along the undercut groove.

A specific embodiment of the stand assembly of the invention comprises an elongated rail member having a longitudinal axis, a plurality of sides, a length of from about 1½ feet up to about 16 feet, and a plurality of leg members. Leg support members each includes a transverse centerline, two outer distal end sections each having an angled planar surface for mounting a leg member, and three transverse slots each having a width that is effective to engage and receive one side of the rail member at the center, forwardly, or rearwardly of the leg support member transverse centerline. Each transverse slot includes a bore extending through the leg member and is effective to receive a threaded projection. The elongated rail member includes undercut grooves each having an inner surface and extending parallel to the longitudinal axis and along the length of at least two sides of the rail member. Means for removably fixing each leg support member to a side of the elongated rail member is disposed in a direction transverse to the rail member longitudinal axis. The means for removably fixing each leg support member to the rail member includes first slide means shaped to fit into an undercut groove on a side of the rail member, and adjusting means for tightening the first slide means against the inner surface of the undercut groove to releasably fix the leg support members to the rail member. Each leg members has one end thereof mounted to the angled planar surface for projecting outwardly from an outer distal end section of the leg support members. Means for supporting the optical device at a selected location on a side of said rail member includes an angle iron bracket having a first leg section that supports universal pivotal coupling means for connecting the optical device to the rail member, and a second leg section that supports second slide means shaped to fit into and be maintained in the one undercut groove for slidably moving the support bracket along the length of the groove. Tightening means for drawing the second slide means against the inner surface of the undercut groove releasably fixes the position of the support bracket at the selected location along the undercut groove.

A feature of the invention is directed to each first slide means having a threaded bore that threadingly engages a fixed threaded projection that extends through a bore disposed within a transverse slot of the leg support members. The adjusting means includes knob means having a a fixedly connected threaded projection that threadingly engages the threaded bore for rotating the threaded projection into the treaded bore to tighten the first slide means against the inner surface of the groove to releasably fix the leg support members to the rail member. The elongated rail member has a length of about 18 inches and each leg support member has a length of about 9 inches so that when each first slide means is loosened, the leg support members may be stored in a direction parallel to the rail member and tightened to be in releasably fixed alignment with the length of the rail member. Each leg member has a delimited length sufficient to maintain the rail member from about 2 inches to about 3 inches above the assembly supporting surface.

Another feature of the invention is directed to the structure of the second slide means that is shaped to slidingly engage and be maintained in an undercut groove of a rail member and includes a threaded bore to threadingly receive a threaded projection that extends through a bore disposed within the second leg section of the angle iron bracket. The tightening means includes knob means fixedly connected to one end of a threaded projection that threadingly engages the threaded bore of the shaped slide means so that by rotating the knob the threaded projection threadingly engages the second slide means to tighten the second slide means against the inner surface of the groove to releasably fix the angle iron bracket to the rail member.

BRIEF DESCRIPTION OF THE DRAWINGS

The above-mentioned and other features, aspects and advantages of the present invention will be better understood from the following detailed description of specific embodiments of the invention in conjunction with the following drawings.

DETAILED DESCRIPTION OF THE INVENTION

Figure 1:
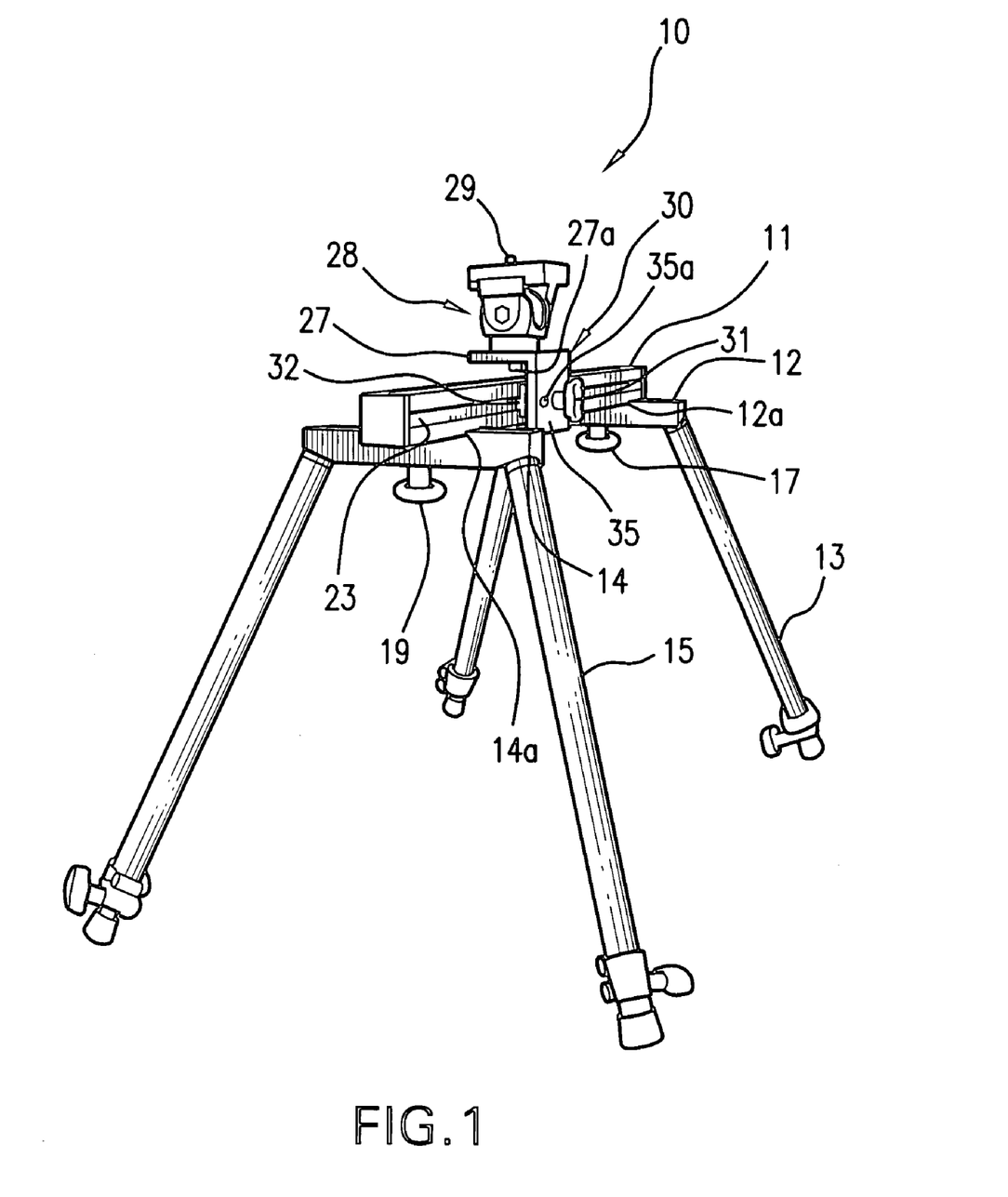
FIG. 1 is a perspective front view of a first embodiment of an optical device stand assembly of the invention shown with an elongated rail member horizontally disposed with respect to the support surface on which the assembly is located.
Figure 2:
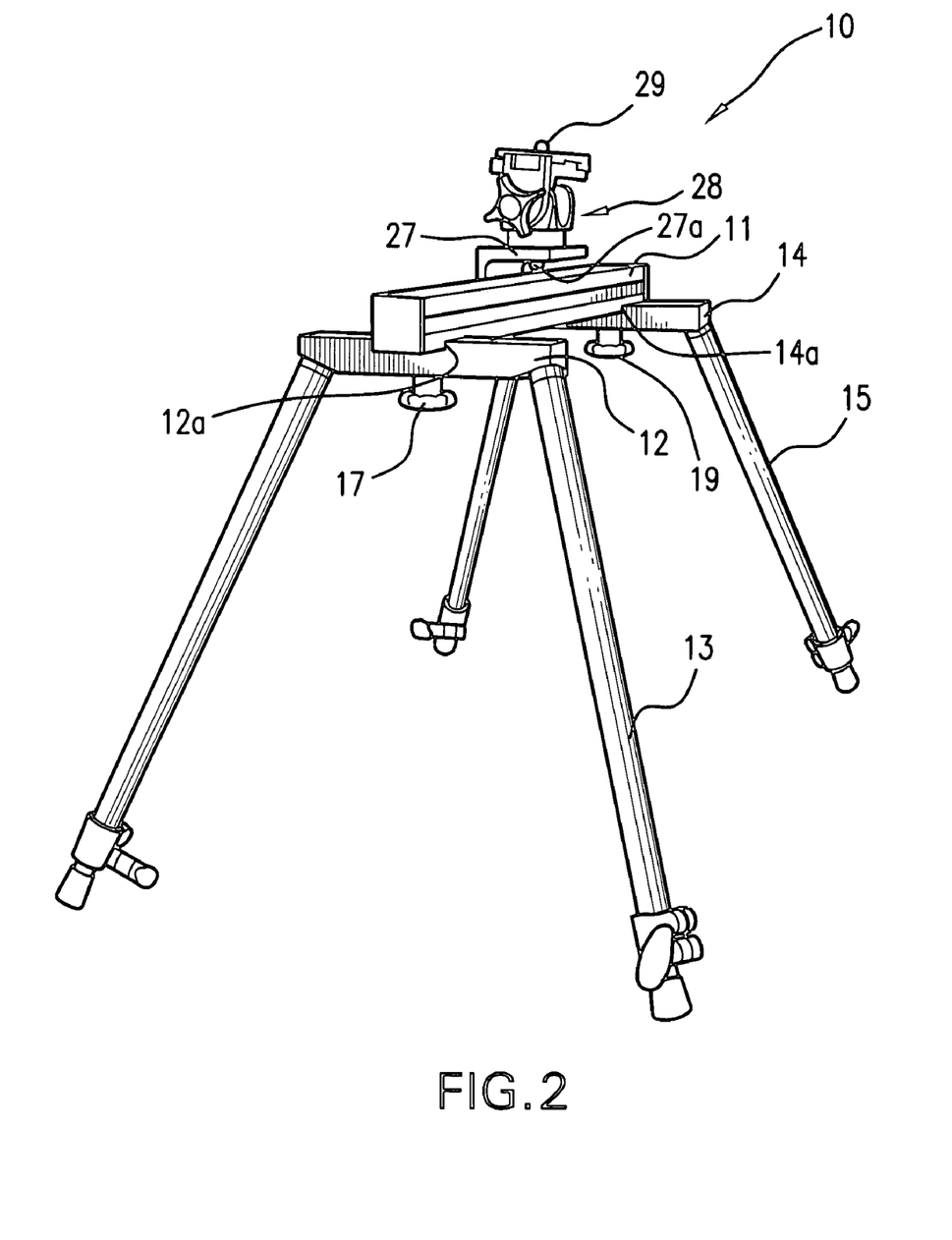
FIG. 2 is a perspective rear view of the optical device stand assembly of FIG. 1 shown with the elongated rail member horizontally disposed with respect to the support surface on which the assembly is located.
Figure 3:
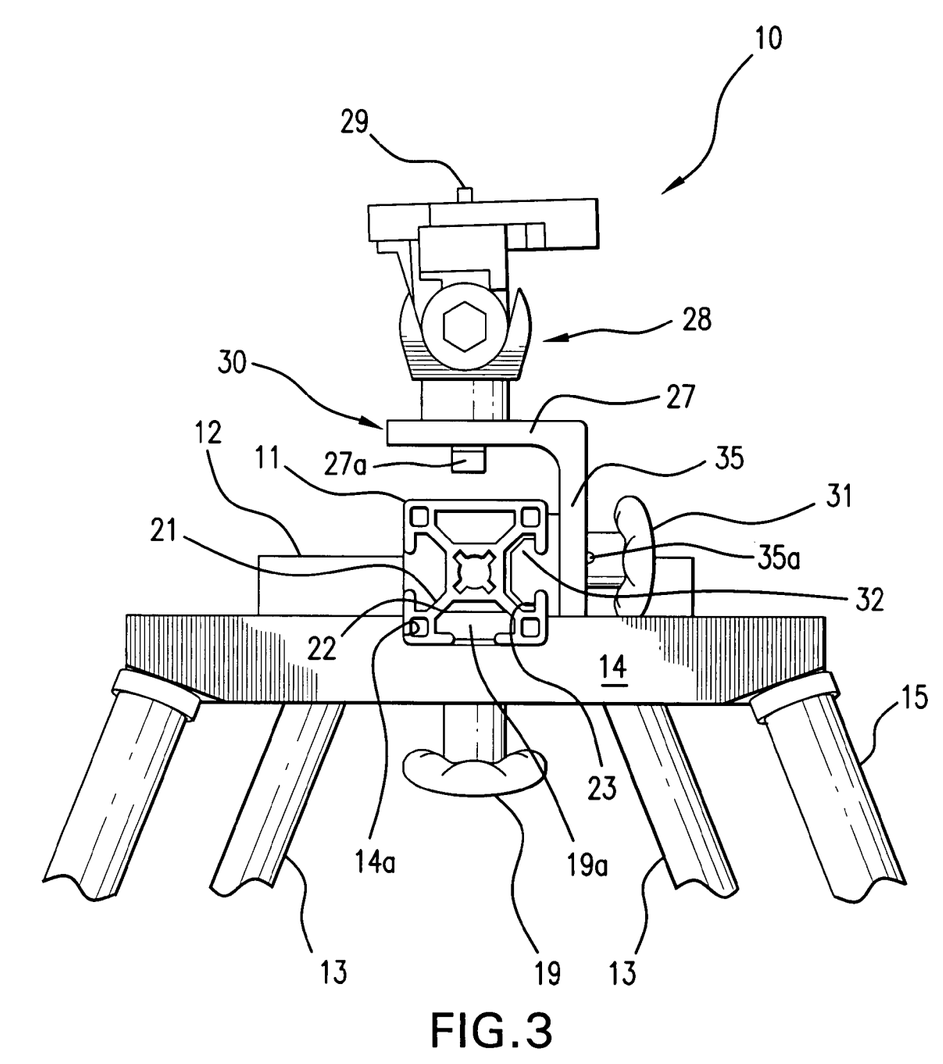
FIG. 3 is a perspective end view of the optical device stand assembly of FIG. 1 shown with the elongated rail member with an end cap removed.

A first embodiment of the invention shown in FIGS. 1-3 comprises an optical device stand assembly, generally designated 10, including an elongated rail member or beam 11, at least two (2) outrigger or leg support members 12 and 14 transversely and removably fixed to rail member 11, and a plurality of leg members 13 and 15 each mounted to an angled planar surface located at distal end sections of each leg support member 12 and 14.

As is evident in the drawings, rail member 11 includes undercut grooves 21, 22, and 23 each having an inner surface and extending parallel to the longitudinal axis of rail member 11. Groove 23 slidably carries an optical device support bracket, generally designated 30, along the groove length, and groove 22, on another side of assembly 10, carries outrigger or leg support members 12 and 14 with attached leg members 13 and 15. Outrigger members 12 and 14 are longitudinally laterally spaced along rail member 11 when it is horizontally disposed on a device supporting surface. Each leg member 13 and 15 includes an outer free end thereof defining an assembly footprint when stand assembly 10 is disposed in a free-standing position. Stand assembly 10 is effective to support an optical device, such as a film camera, a digital camera, or a video camera, above the assembly footprint and to suspend its objective lens over one of the opposite edge portions of rail member 11. Stand assembly 10 may also be used to support a lighting device, magnifiers, and/or an observation scope or some combination thereof.

More particularly, adjusting knobs 17 and 19 include threaded projections that threadingly engage slide members or nuts 19a shaped to slidingly fit into undercut groove 22 (FIG. 3), and to removably fix two (2) outrigger or leg support members 12 and 14 each having a respective single transverse center slot 12a and 14a that receives one side of rail member 11. Leg members 13 and 15 threadingly engage threaded projections (not shown) located on the angled planar surfaces of distal end sections of respective outrigger members 12 and 14.

Undercut groove 23 slidably carries optical device support bracket, generally designated 30, along the groove length on a side of assembly 10 perpendicular to the side bearing leg members 13 and 15. Angle iron bracket 30 has leg section 27 that supports universal pivot mount, generally designated 28, and leg section 35 that removably supports a tightening mechanism comprising slide member 32 and rotatable knob 31. Slide member 32 is shaped to fit into and be maintained in undercut groove 23 for sliding movement along the groove length. Threaded bolt 27a releasably fixes pivot mount 28 to leg section 27 for connecting an optical device to rail member 11, and threaded screws or bolts 35a removably fix slide member 32 to leg section 35. Pivot mount 28 coupled to bracket 30 includes threaded projection 29 that engages a camera or any other optical device to removably fix it on mount 28 and outwardly from the assembly support surface and may suspend the objective lens of a camera over one of the opposite edge portions of rail member 11. Rotatable knob 31 is fixed to a threaded projection that threadingly engages a delimited section of slide member 32 so that upon rotation, knob 31 draws the delimited section of slide member 32 against the inner surface of undercut groove 23 to releasably fix bracket 30 at a selected position along rail member 11. (Details of slide members 32 and 32a conform to the structure of slide member 48, 48a in the embodiment shown in FIGS. 8 and 9). Slide members 32 and 32a may be composed of fiberglass or any other resinous-like material.

Figure 4:
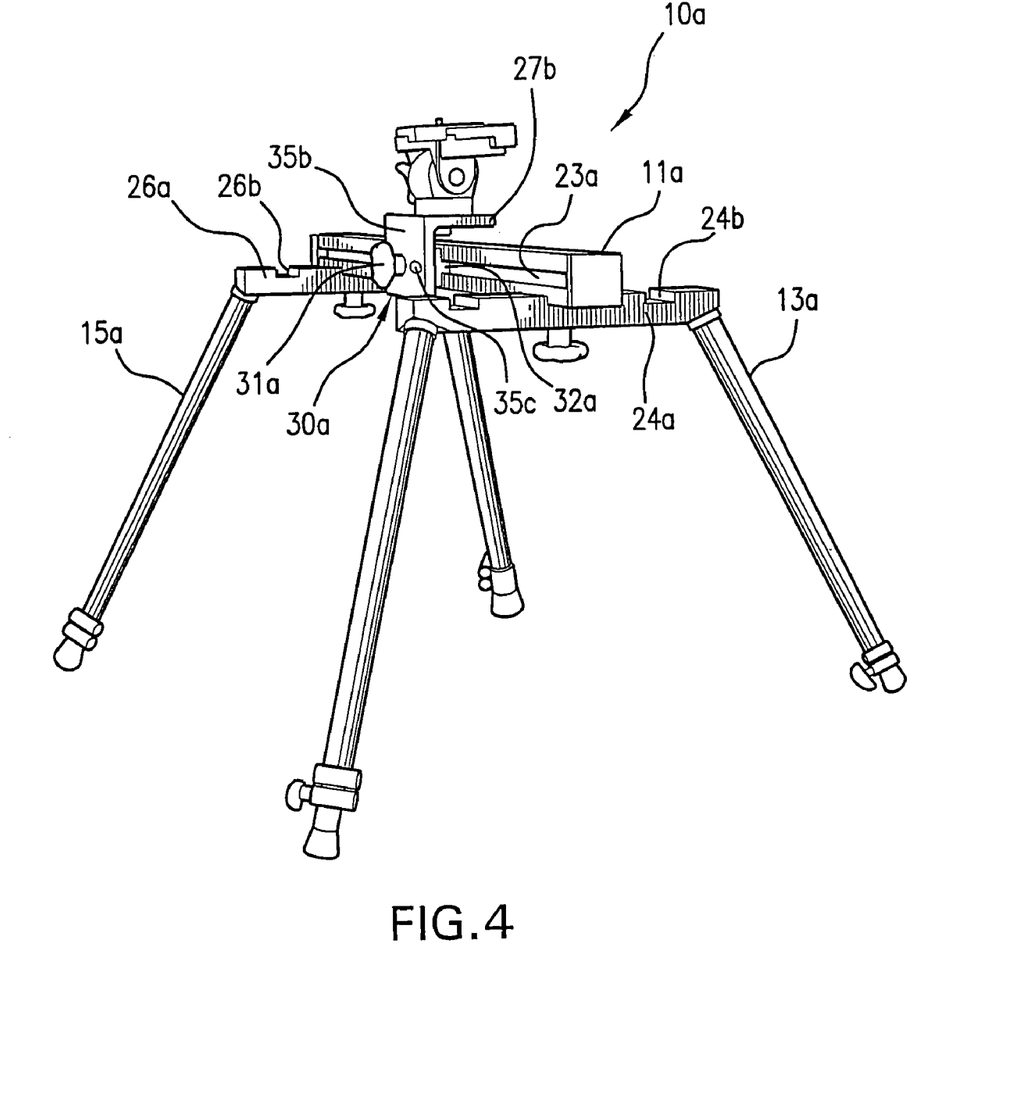
FIG. 4 is a perspective front view of another embodiment of an optical device stand assembly of the invention shown with outrigger or leg support members having one of a plurality of transverse slots engaging an elongated rail member horizontally disposed with respect to the support surface on which the assembly is located.
Figure 5:
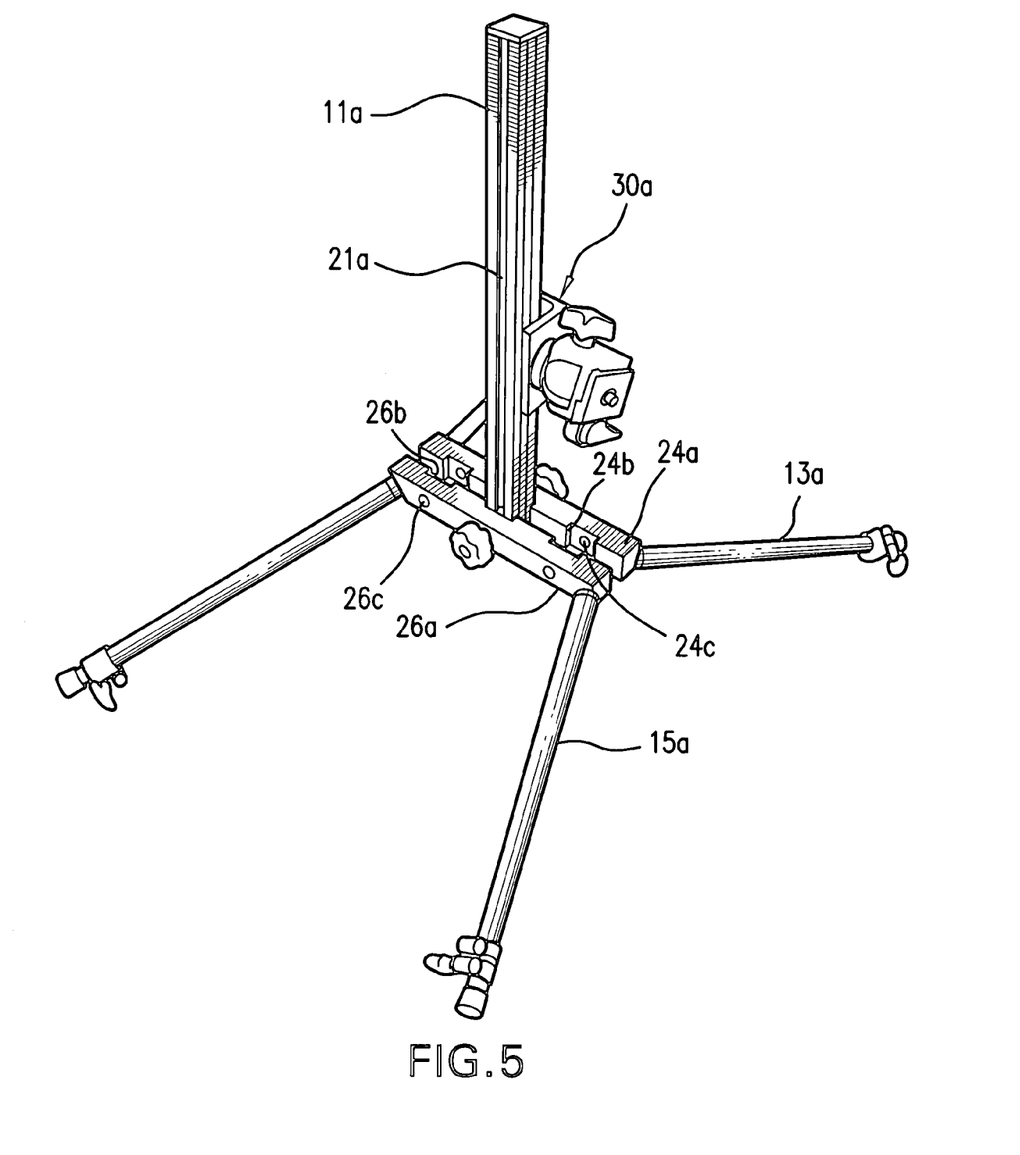
FIG. 5 is a perspective view of the optical device stand assembly of FIG. 4 shown having leg support members and leg members mounted to opposite surfaces of the elongated rail member that is normal or vertically disposed with respect to the support surface on which the assembly is located.
Figure 6:
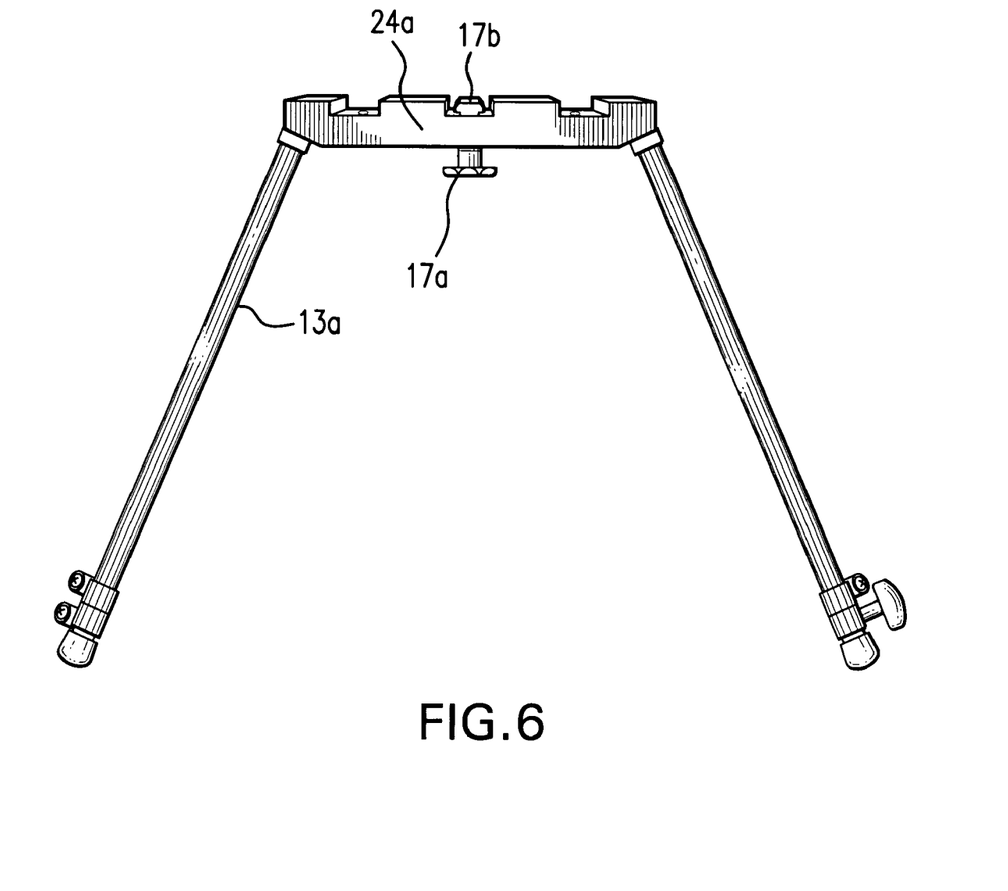
FIG. 6 is a fragmentary perspective elevational view of an outrigger or leg support member of the optical device stand assembly of FIG. 4 shown with leg members removably disposed at distal ends thereof.

FIGS. 4-6 show another embodiment of my optical device stand assembly, generally designated 10a, including outrigger members 24a and 26a having three (3) transverse slots 24b and 26b that have bores 24c and 26c (FIG. 5) and engage and receive one side of elongated rail member 11a that may be selectively disposed in any one of a multiple positions—at the transverse centerline across the longitudinal axis of leg support members 24a and 26a, or forwardly and rearwardly of the leg support transverse centerline. The structural configuration of outrigger or leg support members 24a and 26a of FIGS. 4-6 thus differ from leg support members 12 and 14 of FIGS. 1-3. Nevertheless, each pair of outrigger or leg support members 12 and 14, and 24a and 26a is identical in structural configuration with respect to each other and therefore interchangeable and universal in use. Elongated rail member 11a, leg members 13a and 15a, optical device support bracket 30a and undercut grooves 21a (FIG. 5) and 23a (FIG. 4), are identical in structure to corresponding elements of the embodiment of FIGS. 1-3. As is evident in the drawings, bracket 30a has a first leg section 27b that removably supports a universal pivot mount, as shown, and in a manner as described with respect to the embodiment of FIG. 3. Bracket 30a also includes leg section 35b that removably supports a tightening mechanism comprising a sectioned slide member 32a and a rotatable knob 31a that operates to tighten the sectioned slide member 32a to bracket 30a in the manner described with respect to the sectioned slide member 48, 48a shown in FIGS. 7-9. Threaded screws or bolts 35c removably fix end sections of slide member 32a to leg section 35b. When rail member 11a is normal to the device supporting surface, as shown in FIG. 5, outriggers 24a and 26a are slidably and fixedly disposed in grooves 21a and 23a located on opposite sides of rail member 11a that extends vertically.

In this specific embodiment, outrigger or leg support members 24a and 26a are about nine (9) inches long with three (3) slots—one (1) at the transverse centerline and each of two (2) laterally spaced about 1½ inches on either side of the center slot—so as to make outriggers 24a and 26a universal in their use. As shown in FIG. 6, outrigger or leg support member 24a includes leg members 13a threadingly connected to angled planar surfaces at the outrigger distal ends. Adjusting knob 17a has a fixed threaded projection that extends through a bore into a center slot to threadingly engage a slide member or nut 17b shaped to fit into and be maintained in an undercut groove.

Outrigger members 24a and 26a may have more transverse slots depending on the number of extra rail members required for supporting lights, or moving rail members back and forth with respect to the transverse centerline of the outrigger members. Telescoping leg members may be used and moved in or out making the assembly short or tall and the footprint smaller or larger.

Figure 7:
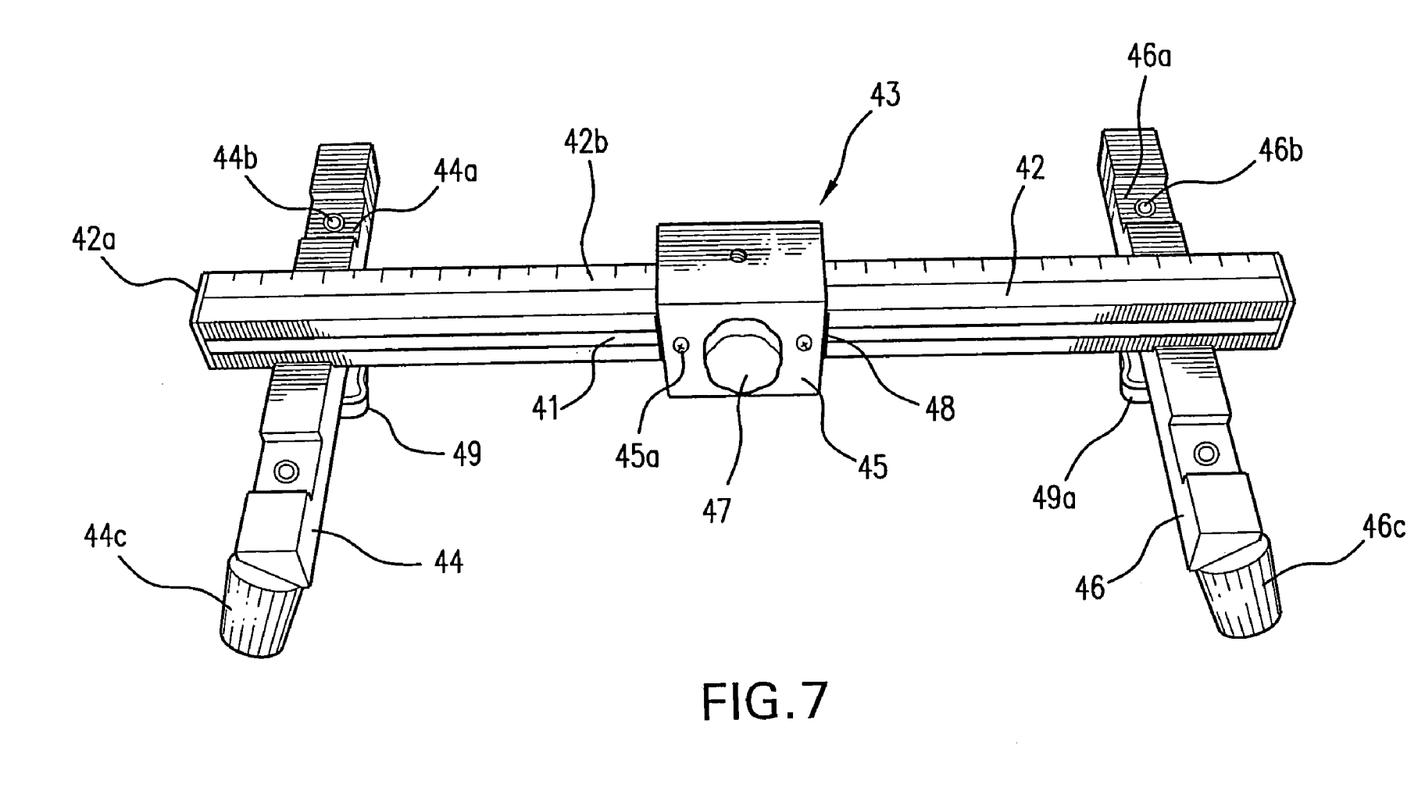
FIG. 7 is a perspective front view of a further embodiment of an optical device stand assembly of the invention shown with outrigger or leg support members having one of a plurality of transverse slots engaging an elongated rail member horizontally disposed with respect to the support surface on which the assembly is located.
Figure 10:
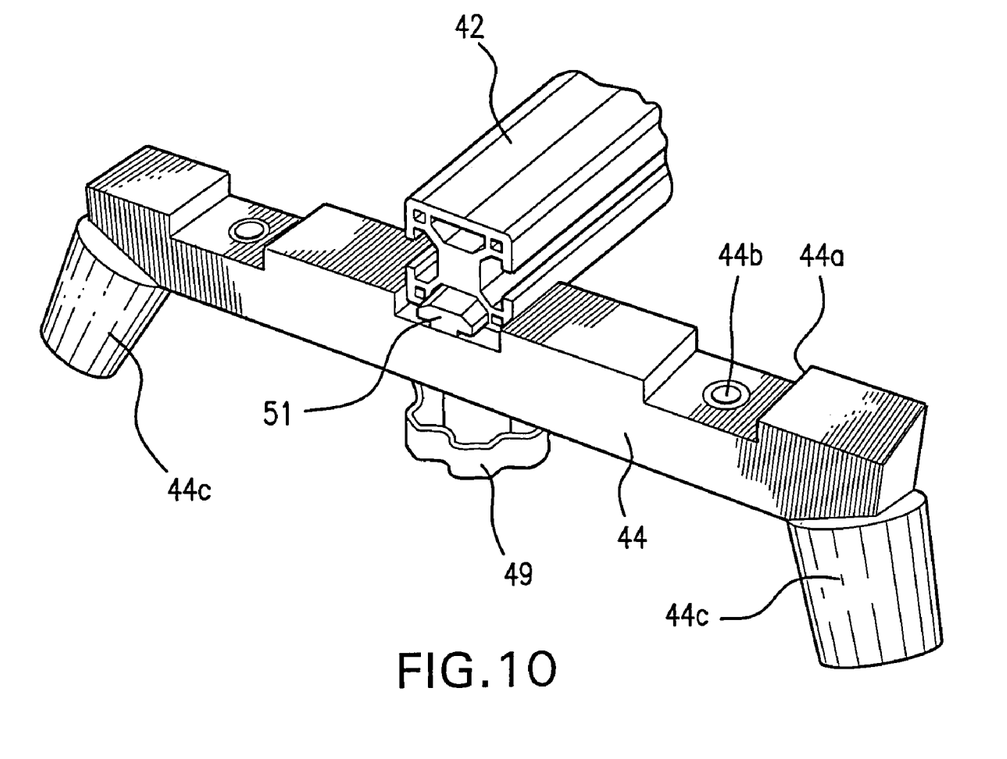
FIG. 10 is a fragmentary perspective top view of a slide member associated with a leg support member of the stand assembly of FIG. 7 with an end cap removed showing a shaped slide member as it fits into an undercut groove of the assembly.
Figure 11:
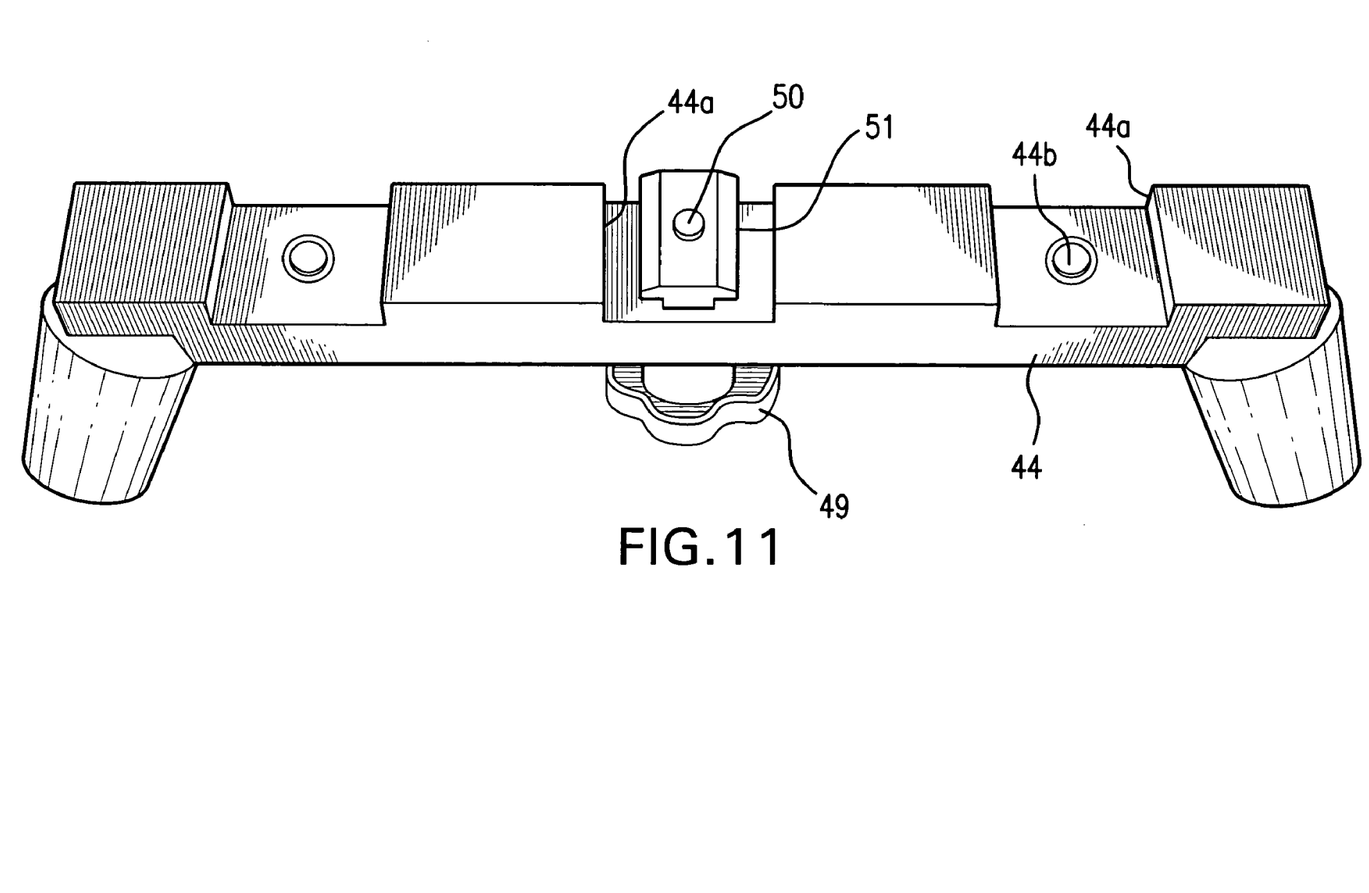
FIG. 11 is a perspective top view of a leg support member of the stand assembly of FIG. 7 showing the shaped slide member with a fixedly attached threaded projection in a bore of a transverse slot along the transverse centerline of the leg support member.

FIGS. 7 and 10-11 detail the structural configuration of the tightening means used to releasably fit leg support members 44 and 46 on rail member 42 having an end cap 42a at each end thereof. Each slide member 51 (FIGS. 10 and 11) that slidably fits into an undercut groove of rail member 42, shown with end cap 42a removed, is fixed to a threaded projection 50 that extends through bores 44b and 46b disposed within transverse slots 44a and 46a of respective leg support members 44 and 46. As is evident in the drawings, knob members 49 and 49a have threaded projections 50 that threadingly engage threaded bores in slide members 51, as shown in FIG. 11, to tighten slide members 51 against the inner surface of an undercut groove to releasably fix leg support members 44 and 46 to rail member 42 as shown in FIG. 10. Rail member 42 is one inch square and has a length of about 18 inches and each leg support member has a length of about 9 inches so that when each slide member 51 is loosened, leg support members 44 and 46 may be stored in a direction parallel to rail member 42 and tightened to be in releasably fixed alignment with the length of rail member 42. As shown, each leg member 44c and 46c has a delimited length sufficient to maintain rail member 42 from about 2 inches to about 3 inches above the assembly supporting surface. When leg support members 44 and 46 are folded in alignment with rail member 42, the resultant folded combination may then be placed in a bag made of flexible material for transport and storage.

Figure 8:
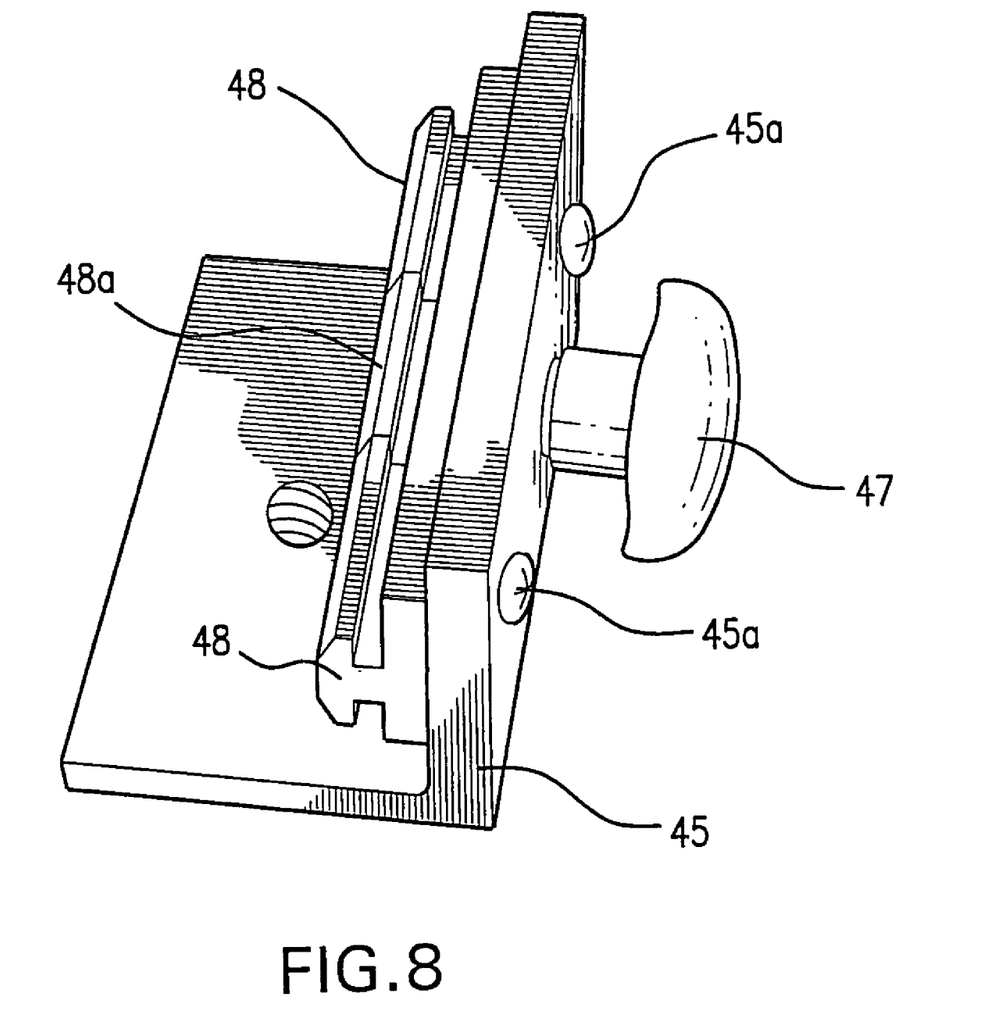
FIG. 8 is a perspective bottom view of an angle iron optical device support bracket of the stand assembly of FIG. 7 showing a segmented slide means that fits into an undercut groove of the assembly.
Figure 9:
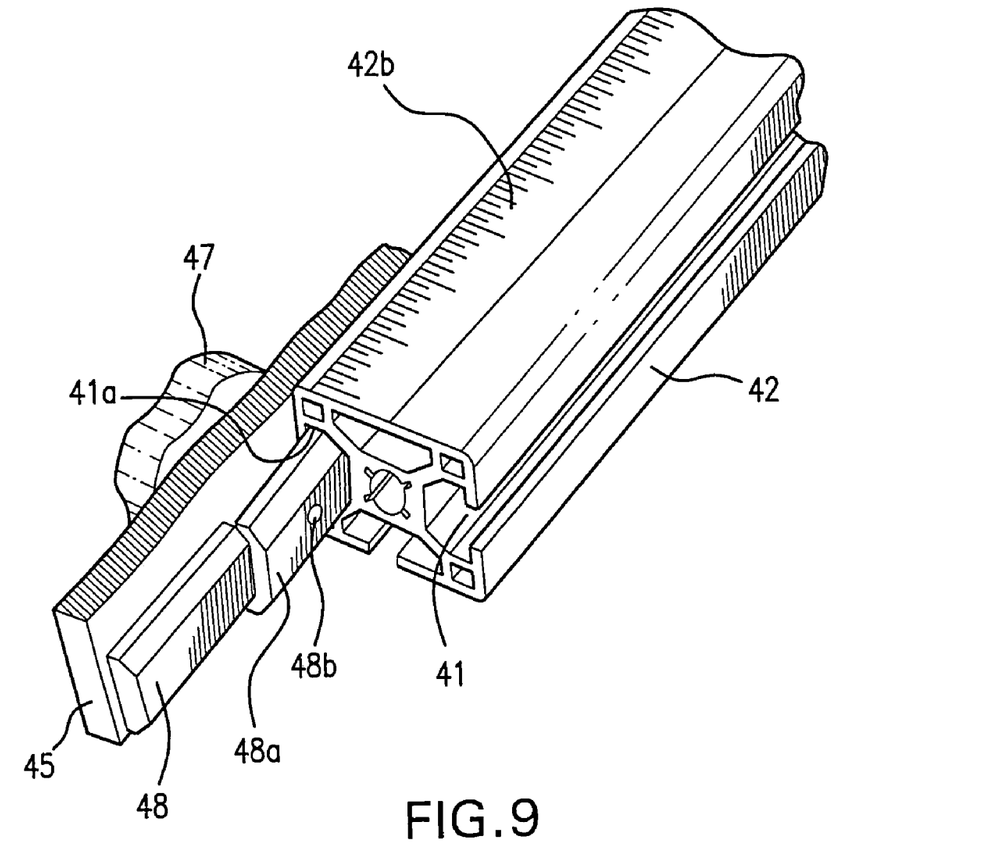
FIG. 9 is a fragmentary perspective top view of a slide member shown without the first leg section of the angle iron optical device support bracket of the stand assembly of FIG. 8 with an end cap removed showing the slide mechanism as it fits into an undercut groove of the assembly.

The optical device support mechanism, generally designated 43, shown in FIGS. 7-9 includes means for connecting a pivotal optical device mount (not shown) to a threaded bore in a first leg section of an angle iron bracket 43. Threaded screws 45a fix slide member end segments 48 to second leg section 45 of the angle iron bracket. Slide member 48 (FIGS. 8 and 9) includes movable, shaped tightening segment 48a having a delimited length and threaded bore 48b that threadingly engages a threaded projection (not shown) fixed at one end thereof to knob 47 and extends through a bore (not shown) located in leg section 45 of the angle iron bracket 43 as shown in the drawings. Thus, by rotating knob 47, its threaded projection threadingly engages and draws slide member segment 48a against an inner surface of groove 41a to releasably fix the angle iron bracket to rail member 42. FIG. 9 shows (with the end cap removed from rail member 42) how shaped slide member 48 with tightening segment 48a may fit into undercut groove 41a. A graduated ruler 42b disposed along the length of rail member 42 enables accurate camera placement.

Depending on the assembly footprint desired, different types and length of rail members can be used to customize the footprint to the subject being examined or photographed. For example, four (4) foot or 16 foot long rail members may be used or shorter assemblies may be coupled end-to-end to extend the footprint length. The same outriggers or leg support members are usable because rail member outer dimensions remain the same. Rail members may be used that have different cross-sectional shapes such as a three-sided cross-section instead of a four-sided cross-section. Alternatively, a rail member that is about one inch thick and about three-and-a-half inches wide may be used to satisfy those who wish to work with heavier duty stock.

The assembly of the invention may be used for taking some special type pictures that may involve putting the subject in the middle of the footprint. A 3D image may be produced by taking a picture, looking at the field of view, moving the camera over to overlap the field by 60%, and taking another exposure. So the movable camera support bracket actually allows the making of stereo pictures without having a stereo camera. Setting the rail member away from the center of the outrigger, moves the camera back to change its location of the focus within the footprint so as to avoid showing the leg members in the photo. Multiple slots in the outriggers allow other beams to be placed across the outriggers to make the assembly even more sturdy.

The rugged, classic design and smooth operation of its structural configuration make versatile the use of the optical device stand assembly that is adaptable to many situations. The stand assembly of the invention is usable in the field of forensics for providing photographic evidence to record scientific data, crime scene investigation findings, documents, ballistics, tool marks, genealogy, field and laboratory application results, conducting autopsies, and three-dimensional imaging.

While the optical device support assembly has been shown and described in detail, it is obvious that this invention is not to be considered as limited to the exact form disclosed, and that changes in detail and construction may be made therein within the scope of the invention without departing from the spirit thereof.

I claim:

1. A free-standing assembly for maintaining an optical device at a location spaced from a stand assembly supporting surface, said stand assembly comprising:
   a) an elongated rail member having a longitudinal axis and undercut grooves each having an inner surface and extending parallel to said longitudinal axis and along the length of two sides of the rail member;
   b) leg support members for undergirding said elongated rail member, each said leg support member including a transverse centerline and two outer distal end sections each having means for mounting a leg member;
   c) means for removably fixing each said leg support member to a first side of the elongated rail member and in a direction transverse to said longitudinal axis;
   d) said means for removably fixing each said leg support member to the rail member including first shaped slide means for slidingly engaging and being maintained in an undercut groove on said first side of the rail member, and adjusting means for tightening said shaped first slide means against said inner surface of said undercut groove to fix the leg support members to the rail member;
   e) a plurality of leg members each including means for mounting one end thereof to project outwardly from an outer distal end of each said leg support member, each said leg member including an outer free end thereof defining an assembly footprint when the stand assembly is freestanding on said stand assembly supporting surface; and
   f) mounting means for supporting said optical device on another side of said rail member including second slide means shaped to slidingly engage and be maintained in an undercut groove on a second side of the rail member for moving said optical device along said elongated rail member, and tightening means for drawing said second slide means against said inner surface of said undercut groove to selectively fix and position the mounting means along said rail member.

2. A stand assembly as defined in claim 1 wherein
said mounting means for supporting said optical device includes a support bracket;
said second slide means is shaped to fit into and be maintained in one undercut groove on a side of the rail member for moving said support bracket along the length of the rail member; and
an undercut groove on another side of the rail member carries two said leg support members longitudinally laterally spaced along said rail member so that the rail member is disposed substantially horizontal with respect to the assembly supporting surface.

3. A stand assembly as defined in claim 1 wherein
said mounting means for supporting said optical device includes a support bracket;
said second slide means is shaped to fit into and be maintained in one undercut groove on a side of the rail member for moving said support bracket along the length of the rail member; and
undercut grooves on opposite sides of the rail member each carry a said leg support member so that the rail member is disposed substantially perpendicular with respect to the assembly supporting surface.

4. A stand assembly as defined in claim 1 wherein
each said leg support member includes a transverse slot that is parallel to said transverse centerline of said leg support member;
said slot has a width effective to engage and receive one side of said rail member with a bore extending through the leg member and effective to receive a threaded projection;
said first shaped slide means includes a threaded bore to threadingly receive a threaded projection and said adjusting means includes knob means fixedly connected to one end of a threaded projection that threadingly engages said first shaped slide means so that by rotating the knob the threaded projection threadingly engages said first shaped slide means and draws it tightly against said inner surface of the groove to fix said leg support member to the rail member.

5. A stand assembly as defined in claim 4 wherein
each said leg support member includes three transverse slots each having a width effective to engage and receive one side of said rail member at the centerline, forwardly, or rearwardly of said leg support member transverse centerline;

each said slot includes a bore extending through the leg support member and effective to receive said threaded projection.

6. A stand assembly as defined in claim 1 wherein each said leg support member includes a transverse slot that is parallel to said transverse centerline of said leg support member;

said slot has a width effective to engage and receive one side of said rail member, said slot includes a bore that extends through the leg support member and is effective to receive a threaded projection;

said first shaped slide means includes a threaded bore for threadingly engaging one end of a threaded projection; and said adjusting means includes knob means fixedly connected to an opposed end of said threaded projection for rotating said threaded projection in said threaded bore to draw said first slide means tightly against said inner surface of the groove to fix said leg support member to the rail member.

7. A stand assembly as defined in claim 1 wherein two leg support members have identical structural configurations that are effective to be interchangeable and are removably mounted to said elongated rail member to undergird the rail member with an optical device disposed thereon;

said leg support members include means effective to shift the optical device fore or aft of said leg support transverse centerline to improve the center of balance and viewing area for the optical device of the assembly.

8. A stand assembly as defined in claim 7 wherein said leg support members each includes three transverse slots each having a width effective to selectively engage and receive one side of said rail member at the centerline, forwardly, or rearwardly of said leg support members transverse centerline;

each said slot includes a bore extending through each leg support member and being effective to receive a threaded projection.

9. A stand assembly as defined in claim 1 wherein said mounting means for supporting said optical device includes an angle iron bracket having a first leg section that supports universal pivotal coupling means for connecting said optical device to said elongated rail member, and a second leg section that supports said second slide means for moving said support bracket along the length of said undercut groove; and tightening means for drawing the second slide means against said inner surface of the undercut groove to fix and position the angle iron bracket at a selected location along said rail member.

10. A stand assembly as defined in claim 1 wherein each said leg support member includes at the end of each distal end section thereof an angled planar surface that carries said means for mounting said one end of each leg member.

11. A stand assembly as defined in claim 1 wherein said optical device may be a film camera, a digital camera, a video camera, lighting, a magnifier, an observation scope, or some combination thereof.

12. A stand assembly as defined in claim 1 wherein said optical device is a camera having adjustable lens means for projecting outwardly from a camera body portion to provide a selected focal length to photograph an object located in a field of view without obtaining an image of said leg support members or said leg members in a resultant photograph.

13. A free-standing assembly for maintaining an optical device at a location spaced from a stand assembly supporting surface, said stand assembly comprising:

a) an elongated rail member having a longitudinal axis, a plurality of sides, and a length of from about 1½ feet up to about 16 feet, and a plurality of leg members;

b) leg support members each including a transverse centerline, two outer distal end sections each having means for mounting a leg member, three transverse slots each having a width that is effective to engage and receive one side of said rail member at the centerline, and forwardly, or rearwardly of said leg support member transverse centerline;

c) each said slot includes a bore extending through the leg support member and being effective to receive a threaded projection;

d) said elongated rail member including undercut grooves each having an inner surface and extending parallel to said longitudinal axis and along the length of at least two sides of the rail member;

e) means for removably fixing each said leg support member to a side of the elongated rail member and in a direction transverse to the rail member longitudinal axis;

f) said means for removably fixing each said leg support member to said rail member including first shaped slide means for slidingly engaging and being maintained in said undercut groove on a side of the rail member, and adjusting means for tightening said first shaped slide means against said inner surface of said groove to fix the leg support members to the rail member;

g) each said leg member including means for mounting one end thereof to project outwardly from an outer distal end section of said leg support members; and h) means for supporting said optical device at a selected location on a side of said rail member;

i) said means for supporting said optical device including an angle iron bracket having a first leg section that supports universal pivotal coupling means for connecting said optical device to said elongated rail member, and a second leg section that supports second shaped slide means for slidingly engaging and being maintained in said undercut groove for moving said support bracket along the length of the rail member; and j) tightening means for drawing said second shaped slide means against said inner surface of the undercut groove to selectively fix and position the angle iron bracket along said rail member.

14. A stand assembly as defined in claim 13 wherein each said first slide means includes a threaded bore for threadingly engaging one end of said threaded projection that extends through a bore disposed within a transverse slot of said leg support members; and said adjusting means includes knob means fixedly connected to an opposed end of said threaded projection for rotating said threaded projection within said threaded bore to tighten said first shaped slide means against said inner surface of the groove to fix the leg support members to the rail member;

said elongated rail member has a length of about 18 inches and each said leg support member has a length of about 9 inches so that when each said first slide means is loosened, the leg support members may be stored in a direction parallel to the rail member and tightened to be in fixed alignment with the length of the rail member.

15. A stand assembly as defined in claim 14 wherein each said leg member has a delimited length sufficient to maintain the rail member from about 2 inches to about 3 inches above the assembly supporting surface.

16. A stand assembly as defined in claim 13 wherein said second shaped slide means includes a threaded bore to threadingly receive one end of a threaded projection that extends through a bore disposed within said second leg section of said angle iron bracket; and said tightening means includes knob means fixedly connected to an opposed end of said threaded projection that threadingly engages the second shaped slide means for rotating said threaded projection within said threaded bore to tighten said second shaped slide means against the inner surface of the groove to fix said angle iron bracket to the rail member.

17. A stand assembly as defined in claim 13 wherein each said leg support member includes at the end of each distal end section thereof an angled planar surface that carries said means for mounting said one end of each leg member.

18. A free-standing assembly for maintaining an optical device at a location spaced from a stand assembly supporting surface, said stand assembly comprising:

a) an elongated rail member including a longitudinal axis, a plurality of sides, and grooves each having an inner surface and extending parallel to said longitudinal axis and along the length of two sides of the rail member;

b) leg support members each including two opposite outer distal end sections each having means for mounting a leg member;

c) a plurality of leg members each having one end thereof mounted to said outer distal end section to project outwardly from an outer distal end of said leg support members;

d) means for removably fixing each said leg support member to a side of the elongated rail member and in a direction transverse to the rail member longitudinal axis;

e) said means for removably fixing each said leg support member to the rail member includes first shaped slide means for slidingly engaging and being maintained in one of said grooves on a side of the rail member, and adjusting means for tightening said first shaped slide means against said inner surface of said groove to fix the leg support members to the rail member; and f) means for supporting said optical device on another said side of said rail member;

g) said means for supporting said optical device including second shaped slide means mounted to a support bracket for slidingly engaging and being maintained in one of said grooves for slidably moving said support bracket along said one of said grooves, and tightening means for drawing said second shaped slide means against said inner surface of the undercut groove to position and fix the support bracket at a selected location along said groove.

19. A stand assembly as defined in claim 18 wherein each said groove is an undercut groove and each said leg support member includes a bore extending through the leg support member and being effective to receive a threaded projection;

said first slide means having a threaded bore to be threadingly engaged with a threaded projection, and said adjusting means for tightening said first slide means against an inner surface of said undercut groove includes knob means fixedly connected to one end of a threaded projection that threadingly engages said threaded bore of said shaped first slide member so that by rotating the knob means said first slide member is drawn tightly against said inner surface of the undercut groove to fix said leg support member to the rail member;

said support bracket includes an angle iron bracket having a first leg section that supports universal pivotal coupling means for connecting said optical device to said elongated rail member, and a second leg section that supports said second slide means.

20. A stand assembly as defined in claim 18 wherein each said groove is an undercut groove and each said leg support member includes a bore extending through the leg support member and being effective to receive a threaded projection;

each said first shaped slide means includes a threaded bore that threadingly engages one end of a threaded projection that extends through said bore in said leg support members;

said adjusting means includes knob means fixedly connected to an opposed end of said threaded projection for rotating said threadingly engaged threaded projection within said threaded bore to draw said first slide means tightly against said inner surface of said undercut groove to fix said leg support member to the rail member; and said support bracket includes an angle iron bracket having a first leg section that supports universal pivotal coupling means for connecting said optical device to said elongated rail member, and a second leg section that supports said second shaped slide means.

* * * * *